US009222803B2

(12) United States Patent
Hechtfischer et al.

(10) Patent No.: US 9,222,803 B2
(45) Date of Patent: Dec. 29, 2015

(54) METERING AND MEASURING POINT SYSTEM FOR MEASURING AND METERING ELECTRICAL ENERGY AND METHOD

(75) Inventors: Knut Hechtfischer, Berlin (DE); Frank Pawlitschek, Berlin (DE)

(73) Assignee: UBITRICITY GESELLSCHAFT FÜR VERTEILTE ENERGIESYSTEME MBH, Berlin (DE)

( * ) Notice: Subject to any disclaimer, the term of this patent is extended or adjusted under 35 U.S.C. 154(b) by 295 days.

(21) Appl. No.: 13/131,532

(22) PCT Filed: Nov. 25, 2009

(86) PCT No.: PCT/EP2009/065833
§ 371 (c)(1),
(2), (4) Date: May 26, 2011

(87) PCT Pub. No.: WO2010/060927
PCT Pub. Date: Jun. 3, 2010

(65) Prior Publication Data
US 2011/0227755 A1 Sep. 22, 2011

(30) Foreign Application Priority Data
Nov. 27, 2008 (EP) .................................... 08170102

(51) Int. Cl.
| G08B 23/00 | (2006.01) |
| G08C 15/06 | (2006.01) |
| G01D 4/00 | (2006.01) |
| B60L 11/18 | (2006.01) |
| B60L 3/12 | (2006.01) |

(52) U.S. Cl.
CPC . *G01D 4/002* (2013.01); *B60L 3/12* (2013.01); *B60L 11/1816* (2013.01); *B60L 11/1842* (2013.01); *B60L 11/1846* (2013.01); *B60L 11/1848* (2013.01); *B60L 2240/70* (2013.01); *Y02B 90/241* (2013.01); *Y02B 90/248* (2013.01); *Y02E 60/721* (2013.01); *Y02T 10/7005* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 10/126* (2013.01); *Y04S 20/32* (2013.01); *Y04S 20/52* (2013.01); *Y04S 30/14* (2013.01)

(58) Field of Classification Search
CPC ........................................................ G05B 19/00
USPC ........................................ 340/870.01, 870.02
See application file for complete search history.

(56) References Cited

U.S. PATENT DOCUMENTS

| 5,252,078 | A | * | 10/1993 | Langenbahn | B60L 11/1818 320/109 |
| 5,548,200 | A | * | 8/1996 | Nor | B60L 11/184 320/106 |
| 5,563,491 | A | * | 10/1996 | Tseng | B60L 11/1816 194/904 |
| 5,742,229 | A | * | 4/1998 | Smith | B60L 11/1824 235/381 |
| 6,614,204 | B2 | * | 9/2003 | Pellegrino | B60L 11/1816 320/109 |
| 6,930,410 | B2 | * | 8/2005 | Ikeda | B60L 3/00 235/381 |
| 7,693,609 | B2 | * | 4/2010 | Kressner | B60L 11/14 320/109 |
| 8,138,715 | B2 | * | 3/2012 | Lowenthal | B60L 11/1816 320/104 |
| 8,315,930 | B2 | * | 11/2012 | Littrell | B60L 11/1824 320/109 |
| 8,417,598 | B2 | * | 4/2013 | Pinkusevich | B60L 11/1816 320/109 |
| 8,450,967 | B2 | * | 5/2013 | Lowenthal | B60L 11/1816 320/104 |
| 2002/0158749 | A1 | * | 10/2002 | Ikeda | B60L 3/00 340/5.74 |
| 2006/0259447 | A1 | | 11/2006 | Kings et al. | |
| 2007/0282495 | A1 | | 12/2007 | Kempton et al. | |
| 2008/0039979 | A1 | | 2/2008 | Bridges et al. | |
| 2008/0039980 | A1 | | 2/2008 | Pollack et al. | |
| 2008/0039989 | A1 | | 2/2008 | Pollack et al. | |
| 2008/0040223 | A1 | | 2/2008 | Bridges et al. | |
| 2008/0040479 | A1 | | 2/2008 | Bridge et al. | |
| 2009/0079388 | A1 | * | 3/2009 | Reddy | B60L 11/1818 320/109 |

FOREIGN PATENT DOCUMENTS

| CN | 2850104 | 12/2006 |
| EP | 0769218 | 5/1999 |
| FR | 2742270 | 12/1995 |
| JP | 2002325357 A | 11/2002 |
| JP | 2004246518 | 9/2004 |

(Continued)

OTHER PUBLICATIONS

International Preliminary Report on Patentability for PCT/EP2009/065833 mailed Jun. 30, 2011.

(Continued)

*Primary Examiner* — Amine Benlagsir
(74) *Attorney, Agent, or Firm* — Hauptman Ham, LLP

(57) ABSTRACT

The invention relates to a metering and measuring point system for measuring and metering the electrical energy drawn off a connection device or fed in the connection device by a consumption and/or generation unit at a fixed geographical point, comprising (a) an identifiable stationary connection device as well as (b) an identifiable mobile or non-stationary functional unit, the latter comprising respective devices for (b1) detecting the identifier of the connection device, (b2) metering and measuring the electrical energy drawn off and/or fed in the recognized connection device, (b3) storing the determined metering and measuring data and the determined identifier of the respective connection device being used and (b4) reading out the stored data.

The invention further relates to a method for mobile/non-stationary measuring, metering and billing/clearing of the electrical current.

17 Claims, No Drawings

(56) References Cited

FOREIGN PATENT DOCUMENTS

| WO | 2008/073453 | 6/2008 |
| WO | 2009/052446 | 4/2009 |
| WO | 2010/017905 | 9/2010 |

OTHER PUBLICATIONS

English translation of those portions of the Decision issued by the EPO's Opposition Division that relate to Auxiliary Request 2 issued May 28, 2013 for 08170102.1.

Chinese Search Report mailed Mar. 17, 2013 for 2009801476243.
International Search Report for PCT2009/EP2009/065833.
Fernwirken et al.; "Metering Automation"; Nov. 2004; Euro 5, 80; 32 pages.
Joze Rotar et al.; "Moving-Metering-Management AMR and Energy Data Management for a Railway Company"; Case Study Metering Europe, Bernlin 2004; 29 pages.
European Opposition Brief for EP2192386 dated Dec. 13, 2011.
Korean Office Action dated Oct. 29, 2014.
Australian Patent Application No. 2009319038 dated Apr. 10, 2014.

\* cited by examiner

METERING AND MEASURING POINT SYSTEM FOR MEASURING AND METERING ELECTRICAL ENERGY AND METHOD

CROSS REFERENCE TO RELATED APPLICATION

This application claims the priority of European Patent Application No. 08170102.1, filed on Nov. 27, 2008, in the EP (European Patent Office), the disclosure of which is incorporated herein in their entirety by reference. Further, this application is the National Phase application of International Application No. PCT/EP2009/065833, filed Nov. 25, 2009, which designates the United States and was published in German. Each of these applications is hereby incorporated by reference in their entirety into the present application.

FIELD OF THE INVENTION

The invention relates to a metering and measuring point system for measuring and metering the electrical energy drawn off a connection device or fed in the connection device by a consumption and/or generation unit at a fixed geographical point, comprising (a) an identifiable stationary connection device as well as (b) an identifiable mobile or non-stationary functional unit, wherein the identifiable mobile/non-stationary functional unit comprises respective devices for (b1) detecting the identifier of the connection device, (b2) metering and measuring the electrical energy drawn off and/or fed in the recognized connection device, (b3) storing the determined metering and measuring data as well as the determined identifier of the respective connection device being used and (b4) reading out the stored data.

The invention further relates to a method for mobile/non-stationary measuring, metering and rendering an account of the electrical current.

BACKGROUND OF THE INVENTION

At present, electrical energy is mainly supplied by grid connections that are definitely assigned to a property. These grid connections are definitely assigned to a grid connection holder. For measuring, metering and billing/clearing of the electrical energy drawn off the grid connection, stationary energy meters are moreover permanently installed. The entire electrical energy drawn off the grid connection is thus billed to the grid connection holder. A differentiation as to which person or which consumer has drawn energy off the metered connection is not provided for.

DE 695 09 529 (EP 0 769 281) describes a distribution network. It offers a solution for billing/clearing in a system user-based manner and for not being bound to a fixed geographical point, as provided for, e.g., in SE 425 123, U.S. Pat. No. 4,352,992 or EP 0 047 089.

DE 695 09 529 describes a distribution network comprising (a) electrical wires, (b) a plurality of tap-off facilities with at least one socket means for tapping off electric current and (c) a computer unit communicating with individual or a plurality of tap-off facilities via the power grid. As far as the tap-off facilities are switchable, these tap-off facilities are moreover provided with so-called regulating means and controlling means on the side of the power grid which serve for identifying a user and switching the socket means.

The user that connects the power-consuming unit with the tap-off facility is identified by the computer unit being connected with the tap-off facility or the regulating means via a microprocessor installed in the power-consuming unit. In the described system, thus the tap-off facility and the computer unit connected therewith identify the user or the consuming unit. This is only possible because in the distribution network described in DE 695 09 529 the tap-off facilities are connected with computer units installed for this specific purpose, because in accordance with the invention of DE 695 09 529, the tap-off devices (in connection with the respective computer units installed for this specific purpose) must be capable of storing or accessing or downloading all information about all system users in addition to the information about the tap-off facility itself. In accordance with DE 695 09 529, the identification process, which by switching the controlling means allows the user to draw off electricity, takes place by communication between a computer unit installed specifically for one or a small number of tap-off facilities and the tap-off facility, namely via signals which are superimposed on the distribution network. The distribution network of the invention uses the power line communication between the computer unit and the tap-off facility.

Each identification process and thus also controlling process in the system described in DE 695 09 529 requires a communication—after buffering—between a computer unit integrated for this specific purpose into the power grid and the tap-off facility. The tap-off facility must communicate with the computer unit. Processing and release decisions are made for each individual tap-off facility or technical means provided upstream thereof. According to DE 695 09 529, the tap-off facility is the master of the identification and release process. The distribution network described in DE 695 09 529 cannot be operated without additional technical means (own computer units) being required on the side of the power grid for the communication with the tap-off facilities.

SUMMARY OF THE INVENTION

In accordance with the invention, it is possible to meter and measure electrical energy drawn off or fed in the power grid in a simple manner regardless of the location, i.e., "location-unbound". The invention describes a new solution according to which electrical energy is measured and metered not in sole dependency on a fixed geographical grid connection point but depending on individual consumption and/or generation units or the users thereof (system users) using such a grid connection point (mobile or non-stationary, i.e., not location bound or location-unbound metering and measuring point).

The idea is also new in that the technical demands on the connection device (and thus also the costs for each individual connection device) are minimized. In particular, it is avoided that additional computer units and/or additional technical means, in particular a communication via signals superimposed on the power grid, are required for each connection device or for groups of connection devices.

The invention moreover describes additional functions of a mobile or non-stationary metering and measuring point, said functions being defined in dependent claims 2 to 7.

Methods for measuring, metering and billing/clearing of electrical energy regardless of the location are described in claims 8 to 10.

For solving the technical problem of mobile or non-stationary measuring and metering drawn off and/or fed in electrical energy, the invention uses the knowledge about up to date communication, data transmission and identification technologies. The invention solves the technical problem by means of a measuring and metering point system. The latter comprises a (stationary) connection device permanently connected with the power grid and an identifiable mobile or non-stationary or portable functional unit for measuring and metering the electrical energy that is drawn off or fed in the stationary connection device by a consumption or generation unit.

At first, the stationary connection device is explained in more detail. By means of the (stationary) connection device permanently connected with the power supply, consumption and/or generation units are connected to the power supply (regularly conductively). The connection device is basically a socket, wherein the design is irrelevant. Possible are various kinds of conductive connections, for example for single-phase or multi-phase alternating current, heavy current, direct current, etc. According to the invention, the connection device always needs an identifier for being able to identify the holder of the connection device for the purpose of billing/clearing. This identifier can but does not have to be unique (as the case may be, a plurality of connection devices are assigned to one person). In the simplest form, it is sufficient that the identifier of the connection device is a number which is, e.g., printed on the connection device and on the basis of which the connection device can be identified. Any other form of identifier (no matter whether it is visual, electronic or of any other kind) is likewise possible. It is also possible to identify the connection device by means of a microprocessor.

By means of the identifier, each connection device can be clearly assigned to a billing/clearing partner (grid connection holder) so that billing/clearing can be performed (for example by comparing the identifier with the information about the holder of the grid connection stored in a database or in any other device). Storing further information about the connection device is possible.

A further component of the metering and measuring point system is, in addition to the connection device, a (mobile or non-stationary) functional unit which is not permanently connected with the power grid and which essentially consists of an electricity meter and further (known) devices for detecting the identifier of the connection device, for storing the measuring and metering data as well as the used connection device and a device for reading out the stored data.

Together with the connection device that can be identified because of its identifier, this mobile or non-stationary functional unit forms a metering and measuring point system. The mobile or non-stationary functional unit itself can be clearly identified. It is possible to permanently assign to the unit a definite identity (for example by using a unique electricity meter number). In addition to or instead of a definite meter number, it is moreover also possible that the respective user provides an identity to the unit (in a manner similar to that in which, e.g., a mobile phone becomes a clearly identifiable system user only after insertion of a SIM card) and/or modifies the definite identity.

The mobile or non-stationary functional unit thus comprises at least the following technical devices, wherein the spatial arrangement and/or technical design of these technical devices is variable:

(1) Device for Detecting the Identifier of the Connection Device

A device for detecting the identifier of the connection device is necessary, wherein said device can have different designs.

For example, it is possible that the identifier is detected manually by a user, i.e. by reading the identifier at the connection device and noting, entering etc. this identifier in a suitable device (e.g. writing it down on a sheet of paper for using it later; entering it into a respective device).

It is also possible and preferred to detect the identifier automatically. This can be effected both by the user (in that the person holds a device intended for reading in and storing the identifier to the connection device and the identifier is read into the device) or automatically (in that the consumption unit reads out the identifier of the connection device automatically by using corresponding technical methods, e.g. radio communication). Preferably, this is effected by barcode identifiers and corresponding readers or by RFID tags and RFID readers.

(2) Identifiable Device for Metering and Measuring

Moreover, a device is provided for for metering and measuring the electrical energy which the consumption and/or generation unit draws off and/or feeds in the connection device detected according to (1). This device is an electricity meter (preferably a bi-directional load profile meter for single-phase or multi-phase alternating current), wherein its individual functionality can vary considerably and depends on the application environment of the mobile or non-stationary metering and measuring point.

(3) Device for Storing Data

Moreover, a device for storing the metering and measuring data detected according to (2) as well as the identifier of the respective connection device in use as detected according to (1) is required, wherein it is, e.g., a memory chip, a hard disk or any other memory or storage element in which the data are stored or buffered for further use.

(4) Device for Reading Out Stored Data

Finally, a device for reading out the data stored according to (3) is required. It must be possible to read out both the measuring data and the identifier of the respective connection device in use from the memory for being able to further process them. The data can be read out in various technical manners. As a rule, a data interface is used, via which the data can be read out in various manners (depending on the kind of interface) either manually or in a completely or partially automated manner. For example, an interface for a fully automatic remote readout is possible, where the data are transmitted to a central computer unit, e.g., in a wireless manner. Likewise, an interface for a semi-automatic readout is possible (i.e. in that the user connects the storage medium by means of an interface with a data transmission device and transmits the data to a central computer unit). Also a device for manually/visually reading out the data is possible (e.g. a display from which the visible data can be taken either by hand or in any other way and then transmitted).

The arrangement of the devices discussed above is variable. In particular, a close spatial connection, i.e. arranging all devices at one location, e.g., in one apparatus, is not necessary. It is decisive that the devices described above cooperate in the described manner as a functional mobile or non-stationary unit. The devices are not part of the connection device but are arranged completely or at least partially outside the connection device, preferably completely in the consumption and/or generation unit. This arrangement guarantees that only one of each of the devices described in (1) to (4) is required per mobile consumption and/or generation unit. Unlike in DE 695 09 529, additional computer units which communicate with the connection device or control it and/or a communication via signals that are superimposed on the power grid are not necessary. Except for a simple installation of the connection device, therefore no work on the infrastructure of the power grid is necessary.

The technical problem of providing a metering and measuring point system, however, can also be solved in that the mobile or non-stationary functional unit is arranged completely or partially outside the consumption and/or generation unit and completely or mainly outside the connection device, in the meaning of a separate module. In this case, the technical devices would be integrated into an apparatus connected between the consumption and/or generation unit and the connection device. Thus, it is achieved that consumption and/or generation units in which the devices (1) to (4) are not completely integrated can also use the full functionality of a mobile or non-stationary metering and measuring point.

Thus, it is the gist of the invention that the mobile or non-stationary metering and measuring point of the invention minimizes the technical means present in or at the connection device and thus the devices described in (1) to (4) are not required in the connection device and neither are additional computers for communication with or control of the connection devices.

The functionality of the metering and measuring point system of the invention can be extended by the following preferred embodiments.

Detection of the identifier of the connection device by the mobile or non-stationary functional unit can preferably be automated in that the connection device is identified electronically (e.g., by means of a microprocessor) and the mobile or non-stationary functional unit reads out this identifier (in turn by using a microprocessor). It is also conceivable to use encryption technologies, i.e. an encoded data transmission. The required communication can be effected wireless (e.g., Bluetooth, WLAN, NFC, etc.) or by cable, wherein the cable can also be integrated into the connection line between connection device and mobile or non-stationary functional unit. If the mobile or non-stationary functional unit is placed in the consumption and/or generation unit, the "data line" can also be part of the connection cable of the consumption and/or generation unit.

Additionally, the mobile or non-stationary functional unit can preferably be provided with a device for measuring/testing, periodically or permanently, whether there is still an electrical connection with the connection device and the respective duration of the connection. The detected duration of the electrical connection can be stored in an accordingly modified storing device.

The mobile or non-stationary functional unit is moreover preferably configured such that it allows a consumption and/or generation unit (or its user) to draw off/feed in electrical energy only if it is an authorized system-user. To this end, the connection device can comprise a switch which (for reasons of running and operational safety and legal certainty) only admits an electric current flow if the mobile or non-stationary functional unit approves that the consumption and/or generation unit or its user is authorized to draw off/feed in the connection device (quasi an electronic lock).

In contrast to DE 695 09 529, however, in the present invention the switching or rather the previous identification/authorization of the mobile or non-stationary functional unit are not performed in that the connection device itself or a computer unit connected with it verifies whether the consumption and/or generation unit or the user is authorized to draw off/feed in electrical energy.

According to this preferred embodiment, the mobile or non-stationary functional unit reads out the identifier of the connection device. Then, the mobile or non-stationary functional unit or a computer unit communicating with the unit verifies whether the unit is authorized to draw off/feed in the connection device. In case of a positive result, the mobile or non-stationary functional unit transmits a corresponding signal (quasi an electronic key) to the electronic lock of the connection device, which causes closure of the switch belonging to the connection device.

Upon request by the mobile or non-stationary functional unit or if the electrical connection between the mobile or non-stationary functional unit and the connection device is separated (e.g., after the signal for keeping the switch closed is no longer present), the connection device can finally reopen the switch by means of the electronic lock and interrupt voltage and current flow.

The mobile or non-stationary functional unit can also be combined with a device for communication and remote readout. The data determined at the mobile or non-stationary metering and measuring point and stored in the mobile or non-stationary functional unit must be transmitted for further processing, in particular for billing/clearing purposes. Transmission of the stored data (metering and measuring data as well as the identifier of the connection device and as the case may be the connection period) is a central element of each measuring and accounting system. Moreover, also a communication in the direction of the mobile or non-stationary functional unit is possible, e.g., for the authorization of the switching of the connection device or for the transmission of further data that can be used, e.g., for controlling.

The data are transmitted by means of this device to a computer unit in which they are processed. This data processing forms the basis for billing/clearing of the drawing-off/feeding-in processes at a connection device registered by the respective mobile or non-stationary functional unit.

Various transmission techniques can be used for transmitting the data. In particular, a wireless, automated remote data transmission by means of a corresponding communication device is possible (permanently or periodically). A communication device of this kind can use, e.g., existing mobile communications networks (with different data transmission protocols), a Wireless Local Area Network (WLAN) or other (mobile) radio technologies. The data can be transmitted in non-encoded or encoded form, the latter being desirable and supporting the required data security.

A combination of the mobile or non-stationary metering and measuring point with a semi-automatic data transmission is possible, i.e. the user manually initiates the data transmission by means of the mobile or non-stationary functional unit via an interface (using wireless or cable-related technologies).

The mobile or non-stationary functional unit can be combined with a database in which specific information is stored relating to individual connection devices or groups of connection devices (identifiable on the basis of their identifier), said information going beyond the data required for identifying the connection device and its owner. This information can include, for example:
- the electricity tariff(s) assigned to the grid connection of the connection device,
- the power characteristics of the connection device (at which power level can electrical energy be drawn off or fed in the connection device),
- possible individual load profiles of the connection device at which the consumption and/or generation unit can draw off/feed in energy.

Using this information, all desired parameters of the connection device can be registered and made available. In accordance with the present invention, the connection device does not have to store or provide any information apart from the indicator itself, because all this information is stored outside the connection device and can be requested. Hereby, it is possible to use a particularly simple design for the connection device and to transmit only minimal amounts of data (namely the connection identifier) during the communication.

In accordance with a modification of the embodiment described above, the database can also be deposited completely or partially on the data storage combined with the mobile or non-stationary functional unit. Via the communication interface of the mobile or non-stationary functional unit, the database can then be updated permanently or periodically.

The mobile or non-stationary functional unit can additionally comprise a device allowing for control of the consumption or generation of electrical energy of a connected consumption and/or generation unit. The background is the possibility of a controlled integration of consumption and/or generation units into the power grid. The device for controlling is preferably arranged inside the consumption and/or generation unit and is controlled by the communication device of the mobile or non-stationary functional unit. The device can be realized such that the consumption and/or generation unit receives in a wireless manner from a central computer unit a signal for starting or terminating or performing any other modification of the drawing-off/feeding-in process and the load profile is controlled accordingly.

In the following, a preferred embodiment will be explained.

The invention can be used in the field of electromobility. The following preferred embodiment describes an application that is typical in this field. In the following description, an electric vehicle in which the mobile or non-stationary functional unit according to the invention is integrated is selected as consumption and generation unit. The mobile or non-stationary functional unit and the connection device together form the prerequisites for a metering and measuring point system according to the invention.

Recognition of Grid Connection

When the electric vehicle is connected to the connection device, the switch integrated in the connection device of the present invention is at first open. No current is flowing. Upon connection between electric vehicle and connection device, the reader in the electric vehicle can read out the identifier of the connection device. The readout process can (depending on the installed technical means) take place in a wireless manner or by cable (e.g., by means of the cable used for connecting the electric vehicle with the connection device). The read-out identifier is deposited in the memory.

Authorization of the Mobile or Non-Stationary Functional Unit

The identifier is then used for initiating the authorization of the switching process for the switch integrated in the connection device. This can be done in that the electric vehicle sends the identifier of the connection device to a central computer unit by means of its communication module, and, on the basis of data deposited in relation to the connection device and the user of the electric vehicle, the central computer units sends a signal to the electric vehicle which signal qualifies the electric vehicle or its user as being authorized or not authorized to draw off/feed in electrical energy at the corresponding connection point. For example, the central computer unit can take into account whether the user is in default of payment for previous energy withdrawals and whether the user's electric vehicle can/should draw current off the corresponding connection device.

Communication of Open/Closed-Loop Control Parameters

Moreover, the central computer unit can also transmit further data to the electric vehicle determining the later withdrawal process to the electric vehicle. For example, it is possible to transmit the maximum charging power, a specific charging profile or the like deposited in relation to the connection device. This can be done in accordance with further data (for example about the charging state of the accumulators) which were before transmitted to the central computer by the communication device and which are adjusted to the deposited data of the consumption and/or generation unit.

Switching of the Connection Device

When the electric vehicle receives the authorization signal, it sends, by means of the used electronic process, the electronic key to the electronic lock of the connection device. If the authorization signal (e.g., a specific code) corresponds to the requirements of the electronic lock, the latter closes the switch, and electrical energy can be drawn off or fed in (as the case may be, by taking into account the restrictions transmitted by the central computer unit relating to this connection device and this system user).

In accordance with a modification, it is also possible to deposit the entire data regarding the individual connection devices, the switching/decoding process, the electric vehicle and its user not or not exclusively on a central computer unit but on a memory unit of/within the electric vehicle itself. Hereby, the communication with the central computer unit is not necessary upon connection at first. In this alternative, the data deposited in the memory are synchronized with the data deposited on the central computer unit at regular intervals (automatically or by manual initiation).

Load Profile Measuring/Metering

The load profile meter installed in the electric vehicle as part of the functional mobile or non-stationary unit measures the drawn off/fed in energy. The drawing-off/feeding-in process is continued until it is terminated (i) by the user of the electric vehicle (e.g. by pulling the plug), (ii) by the consumption and/or generation unit itself (e.g., for lack of need, e.g., if the accumulator is full) or—if available—(iii) by the controlling device. Intervention of the controlling device requires a specific request which is sent preferably by the central computer unit to the mobile or non-stationary functional unit and forwarded by the latter to the controlling device. This does not exclude that the battery management system of the electric vehicle controls the consumption independently. The measuring device transmits the measured load profile to the storage device—as the case may be, together with the basic time data of the measurement (start/end)—which deposits said load profile together with the information about the identifier of the connection device in an electronic memory.

Billing/Clearing of the Consumption

The communication module of the electric vehicle transmits (immediately or in a time-delayed manner) the stored data to the central computer unit which stores them in its database. The data are used for billing/clearing of the individual drawing-off processes (with recourse to the data stored in the database of the central computer unit relating to the connection device) to the involved parties (user of the electric vehicle, operator of the connection device). In addition to the differentiation of individual connection devices, also time data and other data stored relating to the drawing-off processes can be taken into consideration.

The solution according to the invention is advantageous in many respects.

The solution according to the invention allows, mainly in the context of the increased introduction of electromobility, to draw electrical energy off the power grid or feed electrical energy in the power grid in a stationary manner at numerous points ("connection devices"), e.g. in the public road system, in parking garages, etc.

and to clearly assign the energy drawn off/fed in at the connection device by a consumption and/or generation unit or the user thereof (e.g., electric vehicle or its user, in the following also briefly referred to as "system user") and to accordingly bill to the latter and the holder of the connection device.

The reason for this being that vehicles which are completely or partly propelled electrically and as a rule can be connected to the power supply by means of a plug ("electric vehicles") can be used the more comprehensively the more connection devices are available. The area-wide provision of connection devices in the public road system and at other public places where the users park their electric vehicles (e.g. at work, in shopping centers, etc.) guarantees that the advantages of electromobility can be used in their entirety. Thus, the user of the vehicle can drive as much of the kilometrage/mileage as possible in an electrically driven manner by using the energy stored in the accumulators of the vehicle.

Also, the area-wide installation of connection devices in various parking situations allows users to connect their electric vehicles to the power grid as often and long as possible and, thus, the electric vehicles are available to a relatively large extent for the controlled and thus very valuable integration into the power grid. In accordance with current estimations, each consumption and/or generation unit (e.g. electric vehicle) requires about four connection devices (namely at home, at work, during shopping and during leisure time activities). However, the mere installation of connection devices is not sufficient for providing an infrastructure which meets the requirements of electromobility. However, the system according to the invention allows to

- identify the consumption and/or generation unit (and/or its user) that requires to draw off energy at a connection device as authorized system user,
- unlock a connection device, which as a rule has a zero potential (switched off) for safety reasons, for usage only,
- measure and meter the drawn off or fed in energy,
- relock the connection device after termination of feeding in/drawing off energy (no current flow possible, switching off),
- transmit the result of the electricity measurement/metering to a billing/clearing house and
- bill the energy drawn off/fed in at the respective connection device to the respective holders of connection devices and consumption and/or generation units.

Billing/clearing the drawn off energy can be system user based (related to a consumption and/or generation unit and/or its user) and does not have to relate exclusively to a fixed geographical point.

For keeping the costs for each connection device as low as possible, the invention provides a technical infrastructure for the connection devices which is as simple as possible. A connection device is preferably structured as follows:

- The identification, communication, billing/clearing and controlling processes take place by using already present infrastructure so that no technical means except for the connection devices (which have a simple structure and can be installed easily) are necessary on the side of the power grid. Thus, both the stationary installed electricity meter and a grid-sided communication (e.g., computer units controlling the connection devices) are not necessary.
- The number of system components required for non-stationary billing/clearing purposes is reduced in that the components are not arranged in the element required most often in the system (the connection devices) but outside this element, preferably in the consumption and/or generation units (saving factor four).
- Information to be stored regarding the connection devices (e.g., holder, electricity rate, exact location, power specifications) are not deposited on a corresponding device of the connection device itself or on a computer unit installed for each connection device or a group of connection devices, but preferably in a central database. By means of the database, it is possible to assign to each connection device the entire information about the grid connection. The connection device itself must only have an identifier on the basis of which the holder of the grid-connection can be identified (for example on the basis of the information deposited in the database).

The invention claimed is:

1. A metering and measuring point system for metering and measuring electrical energy consumption or generation, the system comprising:
    at least one stationary connection device connected to a power grid, the at least one stationary connection device being configured to have electrical energy consumed by a consumption unit drawn off from the at least one stationary connection device or to have the electrical energy generated by a generation unit fed into the at least one stationary connection device, wherein the at least one stationary connection device comprises:
        an identifier configured to identify a grid connection holder associated with the at least one stationary connection device, the grid connection holder being other than a utility provider; and
        a socket; and
    at least one identifiable mobile functional unit configured to be electrically connected to the socket, wherein the at least one identifiable mobile functional unit comprises:
        a detecting device configured to detect the identifier;
        an identifiable device configured to meter and measure the electrical energy drawn off from or fed into the at least one stationary connection device at the socket;
        a storing device configured to store data indicative of the metered and measured electrical energy and the detected identifier; and
        a reading device configured to read out the stored data in the storing device, wherein
    the at least one identifiable mobile functional unit is communicatively coupled with a database stored on a central computer or otherwise outside the at least one stationary connection device, and in which additional data regarding the at least one stationary connection device is stored,
    the database is configured to store information for identifying the grid connection holder, and
    the central computer is configured to:
        adjust a quantity of electrical energy usage allocated to a first account associated with the grid connection holder by an amount of the electrical energy usage based on the data indicative of the metered and measured electrical energy and the detected identifier, and
        allocate the amount of the electrical energy usage based on the communicated data to a second account, different from the first account, the second account being associated with the at least one identifiable mobile functional unit.

2. The metering and measuring point system according to claim 1, wherein
    the identifier is an electronic identifier, and
    the detecting device is a detecting and communicating device configured to electronically detect the electronic identifier, and directly communicate between the at least one stationary connection device and the at least one identifiable mobile functional unit, via at least one of a wireless communication or a wired communication.

3. The metering and measuring point system according to claim 1, wherein
the at least one identifiable mobile functional unit further comprises a connection verification device configured to measure and test whether the at least one identifiable mobile functional unit is electrically connected with the socket, and
wherein
the storing device is further configured to store a detected duration of an electrical connection between the at least one identifiable mobile functional unit and the socket.

4. The metering and measuring point system according to claim 1, wherein
the socket comprises an electronic lock and a switch, the socket is configured to close and electronically lock the switch in response to an electronic key received from the at least one identifiable mobile functional unit, and
the socket is further configured to unlock and reopen the electronically locked switch in response to a request from the at least one identifiable mobile functional unit, and to unlock and reopen the electronically locked switch if an electrical connection between the at least one identifiable mobile functional unit and the socket is disconnected.

5. The metering and measuring point system according to claim 1, wherein the at least one identifiable mobile functional unit further comprises a controlling device configured to control at least one of
the consumption of the electrical energy consumed by the consumption unit, or
the generation of the electrical energy generated by the generation unit.

6. The metering and measuring point system according to claim 5, wherein the controlling device is configured to control the consumption of the electrical energy consumed by the consumption unit or the generation of the electrical energy generated by the generation unit in accordance with a load profile.

7. The metering and measuring point system according to claim 6, wherein the controlling device is configured to communicate a signal to the consumption unit or the generation unit to control a start time, an end time, and to modify a drawing-off or a feeding-in process to adjust the load profile.

8. The metering and measuring point system according to claim 1, wherein the additional data regarding the at least one stationary connection device comprises one or more load profiles of the at least one stationary connection device, and a controlling device is configured to communicate a signal to the consumption unit or the generation unit to cause the drawing-off or the feeding-in of the electrical energy to be in accordance with at least one of the one or more load profiles.

9. The metering and measuring point system of claim 8, wherein the identifiable device configured to meter and measure the electrical energy is a load profile meter, and the data indicative of the metered and measured electrical energy comprises a load profile illustrative of the electrical energy drawn off from or fed into the at least one stationary connection device.

10. The metering and measuring point system of claim 1, wherein the at least one mobile functional unit is configured to communicate with the central computer unit via a wired or a wireless communication channel independent from the at least one stationary connection device.

11. A method, comprising:
determining an identifiable mobile functional unit coupled with at least one of a consumption unit or a generation unit is connected to a socket of a stationary connection device, wherein the stationary connection device is connected to a power grid, the consumption unit is configured to draw off electrical energy from the stationary connection device, the generation unit is configured to feed the electrical energy into the stationary connection device, and the at least one of the consumption unit or the generation unit is downstream of the identifiable mobile functional unit with respect to the socket;
detecting an identifier of the stationary connection device, the identifier being usable to identify a grid connection holder associated with the stationary connection device, the grid connection holder being other than a utility provider;
metering and measuring, using the identifiable mobile functional unit, the electrical energy drawn off from the stationary connection device or the electrical energy fed into the stationary connection device;
communicating data indicative of the metered and measured electrical energy and the detected identifier from the identifiable mobile functional unit to a computer, the computer being apart from the stationary connection device and from the identifiable mobile functional unit;
causing, at least in part, the communicated data and the detected identifier to be processed by the computer to adjust a quantity of electrical energy usage allocated to a first account associated with the grid connection holder by an amount of the electrical energy usage based on the communicated data and the detected identifier; and
causing, at least in part, the amount of the electrical energy usage based on the communicated data to be allocated to a second account, different from the first account, associated with the identifiable mobile functional unit.

12. The method according to claim 11, further comprising:
detecting a duration of an electrical connection between the identifiable mobile functional unit and the socket; and
storing the detected duration of the electrical connection.

13. The method according to claim 11, further comprising:
closing and electronically locking a switch of the socket based on a received electronic key from the identifiable mobile functional unit; and
unlocking and opening the switch based on a determined separation in an electrical connection between the identifiable mobile functional unit and the socket.

14. The method according to claim 13, further comprising:
remotely reading the identifier of the stationary connection device;
verifying whether the identifiable mobile functional unit is authorized to the draw off electrical energy from the stationary connection device or the feed electrical energy into the stationary connection device; and
communicating authorization data to the identifiable mobile functional unit to provide the electronic key.

15. The method according to claim 11, further comprising:
billing and clearing the drawn off electrical energy or the fed in electrical energy,
wherein the billing and clearing is based on the adjusted quantity of the electrical energy usage allocated to the first account associated with the grid connection holder and the amount of the electrical energy usage allocated to the second account associated with the identifiable mobile functional unit.

16. The method according to claim 11, further comprising: controlling one or more of a consumption of the electrical energy by the consumption unit or a generation of the electrical energy by the generation unit.

17. The method according to claim 16, wherein the controlling of the consumption or the generation of the electrical energy is by way of the mobile functional unit in accordance with a predefined load profile.

* * * * *